United States Patent [19]

Martin et al.

[11] Patent Number: 5,071,904

[45] Date of Patent: Dec. 10, 1991

[54] WATERBORNE COATING COMPOSITIONS FOR AUTOMOTIVE APPLICATIONS

[75] Inventors: Roxalana L. Martin, Pittsburgh; Barbara G. Piccirilli, Gibsonia; Dennis L. Faler, Glenshaw, all of Pa.

[73] Assignee: PPG Industries, Inc., Pittsburgh, Pa.

[21] Appl. No.: 671,181

[22] Filed: Mar. 15, 1991

Related U.S. Application Data

[63] Continuation of Ser. No. 357,828, May 30, 1989, abandoned.

[51] Int. Cl.$^5$ ................................................. C08F 2/16
[52] U.S. Cl. .................................... 524/458; 524/460; 524/813
[58] Field of Search ...................... 524/458, 813, 460

[56] References Cited

U.S. PATENT DOCUMENTS

| | | | |
|---|---|---|---|
| 3,953,643 | 4/1976 | Cheung et al. | 428/220 |
| 3,953,644 | 4/1976 | Camelon et al. | 428/220 |
| 4,070,323 | 1/1978 | Vanderhoff | 524/813 |
| 4,098,745 | 4/1978 | Borman | 524/813 |
| 4,220,675 | 9/1980 | Imazaki | 427/27 |
| 4,318,833 | 3/1982 | Guagliardo | 524/457 |
| 4,403,003 | 9/1983 | Backhouse | 427/407.1 |
| 4,489,135 | 12/1984 | Drexler et al. | 428/423.1 |
| 4,539,363 | 9/1985 | Backhouse | 524/460 |

FOREIGN PATENT DOCUMENTS

| | | |
|---|---|---|
| 0269059 | 6/1988 | European Pat. Off. . |
| 308115 | 3/1989 | European Pat. Off. . |
| 1373531 | 11/1974 | United Kingdom . |
| 1403794 | 8/1975 | United Kingdom . |
| 1419199 | 12/1975 | United Kingdom . |
| 2006229 | 5/1979 | United Kingdom . |

OTHER PUBLICATIONS

Backhouse, "Routes to Low Pollution Glamour Metallic Automotive Finishes", Journal of Coatings Technology, vol. 54, No. 693, Oct. 1982.

Pearson, "Water-Based Basecoat for Automotive Industry", Polymer Paint Colour Journal, vol. 177, No. 4195, Jul. 1987.

Oberflache+JOT, "Water-Based Enamel. Has the Breakthrough Succeeded?", Sep. 1985, pp. 48–49.

*Primary Examiner*—Joseph L. Schofer
*Assistant Examiner*—Peter D. Mulcahy
*Attorney, Agent, or Firm*—William J. Uhl; Linda Pingitore

[57] ABSTRACT

A waterborne coating composition having a total solids content at application of greater than 30 percent, contains pigment and a dispersion of polymeric microparticles in an aqueous medium. The microparticles contain greater than 30 percent by weight based on the microparticles of a substantially hydrophobic polymer which is essentially free of repeating acrylic or vinyl units in the backbone, has a molecular weight greater than 300 and is adapted to be chemically bound into the cured coating composition. The aqueous medium of the microparticle dispersion is substantially free of water soluble polymer.

11 Claims, No Drawings

WATERBORNE COATING COMPOSITIONS FOR AUTOMOTIVE APPLICATIONS

This application is a continuation of application Ser. No. 07/357,828, fled May 30, 1989, now abandoned.

CROSS REFERENCE TO RELATED APPLICATIONS

This application is related to Ser. No. 07/330,031, filed on Mar. 29, 1989, now abandoned entitled "Method For Preparing Stably Dispersed Aqueous Microparticle Dispersion".

BACKGROUND OF THE INVENTION

The present invention relates to waterborne coating compositions including, basecoating and clear coating compositions.

Over the past several years there has been a decided trend toward the reduction of atmospheric pollution caused by the volatile solvents which are emitted during painting processes. This trend has been particularly followed by the automotive industry where research efforts have been focused on the objection of fine quality, glamour-like automotive finishes while at the same time reducing or eliminating the organic solvents utilized in the coating compositions.

One approach to emissions control has been the use of water as a solvent in automotive coatings compositions so that organic solvents can be sharply reduced. U.S. No. 4,539,363 and U.S. No. 4,403,003 both to Backhouse, describe a major advance in this art; these patents teach that particulate dispersions (latices) can provide color coats in a basecoat-clearcoat application which are less sensitive to variations in humidity during application and more resistant to popping during baking.

A drawback to this technology si low application solids, presumably due to he water soluble thixotropy-promoting reaction of the aforesaid Backhouse compositions, which forces the applicator to spray large volumes or multiple coats of paint to achieve sufficient film thickness. A second drawback which is characteristic of acrylic latices is that significant organic solvent is still required for flow and coalescence. Thirdly, such products are not well adapted for application over flexible substrates, due to the non-elastomeric nature of cross-linked acrylic polymer films.

Another approach to solve the problems associated with waterborne coatings is the use of polyurethane polymers in aqueous media as described in U.S. No. 4,046,729 to Scriven et al. and U.S. No. 4,489,135 to Drexler et al. While these materials lead to coating switch outstanding flexibility and low organic solvent content, they tend to contain larger fractions of water soluble polymer which can give rise to the problems described in the Backhouse reference and also suffer for the problem of very low applications solids.

It is desirable, therefore, to have waterborne coating compositions which are capable of being formulated at high application solids, with low volatile organic content, and with reduced sensitivity to fluctuation in relative humidity.

SUMMARY OF THE INVENTION

In accordance with the present invention, there is provided a waterborne coating composition having a total solids content at application greater than 30 percent, comprising pigment and a dispersion of polymeric microparticles in an aqueous medium, wherein the microparticles contain greater than 30 percent by weight based on the microparticles of a substantially hydrophobic polymer which is essentially free of repeating acrylic or vinyl units, has a molecular weight greater than 300 and is adapted to be chemically bound into the cured coating composition. The aqueous medium of the microparticle dispersion is substantially free of water soluble polymer.

The waterborne coating compositions of the present invention are particularly suitable for use as automotive basecoating compositions in color plus clear applications. The claimed coatings are particularly advantageous in that they exhibit the flow, coalescence and flexibility of water reducible materials, but which also exhibit the popping resistance and application latitude of a latex. In addition, the compositions can be applied at higher application solids than known compositions along with lower organic solvent content.

Also provided in accordance with the present invention is a clear, waterborne coating composition and a method of preparing a multilayer, coated substrate.

DETAILED DESCRIPTION OF THE INVENTION

The claimed waterborne coating compositions comprise as a film former, a dispersion of polymeric microparticles in an aqueous medium. The microparticles contain greater than 30 percent by weight based on the microparticles of a substantially hydrophobic condensation polymer having a molecular weight of greater than 300. The substantially hydrophobic polymer is essentially free of repeating acrylic or vinyl units in the backbone. Preferably the microparticles contain greater than 40 percent by weight of the substantially hydrophobic polymer, more preferably greater than 50 percent. By substantially hydrophobic is meant that upon mixing a sample of polymer with an organic component and water, a majority of. the polymer is in the organic phase and a separate aqueous phase is observed. Examples of suitable condensation polymers include polyesters, polyurethanes, polyethers and alkyds which are discussed in detail below.

It should be understood that the substantially hydrophobic polymer having a molecular weight greater than 300 is adapted to be chemically bound into the cured coating composition. That is, the polymer is reactive in the sense that it contains functional groups such as hydroxyl groups which are capable of coreacting, for example, with a crosslinking agent such as melamine formaldehyde which may be present in the coating composition or alternatively with other film forming resins which also may be utilized. Preferably, the polymer has a molecular weight greater than 500, more preferably greater than 800. Typically the molecular weight ranges from about 300 to about 10,000, more usually from about 300 to about 2000. By "essentially free of repeating acrylic or vinyl units" is meant that the polymer is not prepared from typical free radically polymerizable monomers such as acrylates, styrene and the like.

As was mentioned above, the polyester, polyurethane, alkyd and polyether resins are examples of suitable substantially hydrophobic polymers. The polyester resins contain essentially no oil or fatty acid modification. That is, while alkyd resins are in the broadest sense polyester type resins, they are oil-modified and thus not generally referred to as polyester resins. The polyesters are of two kinds. One type are the unsaturated polyesters derived from unsaturated polyfunctional acids and polyhydric alcohols. Maleic acid and fumaric acid are the usual unsaturated acid components although (meth-)acrylic acid unsaturated alcohols such as trimethylolpropane mono- or diallyl esters can also be used. Commonly used polyhydric alcohols are 1,4-butanediol, 1,6-hexanediol, neopentyl glycol, ethylene glycol, propylene glycol, diethylene glycol, dipropylene glycol, butylene glycol, glycerol, trimethylolpropane, pentaerythritol and sorbitol. Oftentimes a saturated acid will be included in the reaction to provide desirable properties. Examples of saturated acids include phthalic acid, isophthalic acid, adipic acid, azeleic acid, sebacic acid and the anhydrides thereof. The saturated polyesters are derived from saturated or aromatic polyfunctional acids, preferably dicarboxylic acids, and mixtures of polyhydric alcohols having an average hydroxyl functionality of at least 2. Other components of polyesters can include hydroxy acids and lactones such as ricinoleic acids, 12-hydroxystearic acid, caprolactone, butyrolactone and dimethylolpropionic acid.

The alkyds are polyesters of polyhydroxyl alcohols and polycarboxylic acids chemically combined with various drying, semi-drying and non-drying oils in different proportions. Thus, for example, the alkyd resins are made from polycarboxylic acids such as phthalic acid, maleic acid, fumaric acid, isophthalic acid, succinic acid, adipic acid, azeleic acid, sebacic acid as well as from anhydrides of such acids, where they exist. The polyhydric alcohols which can be reacted with the polycarboxylic acid include 1,4-butanediol, 1,6-hexanediol, neopentyl glycol, ethylene glycol, diethylene glycol and 2,3-butylene glycol, glycerol, trimethylolpropane, trimethylolpropane, pentaerythritol, sorbitol and mannitol.

The alkyd resins are produced by reacting the polycarboxylic acid and the polyhydric alcohol together with a drying, semi-drying or non-drying oil in proportions depending upon the properties desired.

The oils are coupled into the resin molecule by esterification during the manufacturing and become an integral part of the polymer. The oil is fully saturated or predominately unsaturated. When cast into films, the fully saturated oils tend to give a plasticizing effect to the film, whereas the predominately unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well know in the art.

Examples of polyether polyols are polyalkylene ether polyols which include those having the following structural formula:

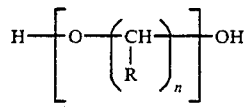

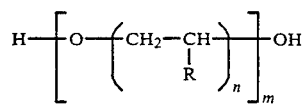

where the substituent R is hydrogen or lower alkyl containing from 1 to 5 carbon atoms including mixed substituents, and n is typically from 2 to 6 and m is from 10 to 100 or even higher. Included are poly(oxytetrsethylene) glycols, poly(oxy-1,2-propylene) glycols and poly(oxy-1,2-butylene) glycols.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide, in the presence of an acidic or basic catalyst.

With polyether polyols, it is preferred that the carbon to oxygen weight ratio be high for better hydrophobic properties. Thus, it is preferred that the carbon to oxygen ratio be greater than 3/1 and more preferably greater than 4/1.

The polyurethane resins can be prepared by reacting a polyol with a polyisocyanate. The reaction can be performed with a minor amount of organic polyisocyanate (OH/NCO equivalent ratio greater than 1:1) so that terminal hydroxyl groups are present or alternatively the OH/NCO equivalent ratio can be less than 1:1 thus producing terminal isocyanate groups. Preferably the polyurethane resins have terminal hydroxyl groups.

The organic polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis (cyclohexyl isocyanate) and isophorone diisocyanate. Useful aromatic diisocyanates and araliphatic diisocyanates include the various isomers of toluene diisocyanate, meta-xylylenediioscyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition the various isomers of alpha, alpha, alpha', alpha'-tetramethyl xylylene diisocyanate cpn be used. Also useful as the polyisocyanate are isocyanurates such as DESMODUR 3300 from Mobay and biurets of isocyanates such as DESMODUR N100 from Mobay.

The polyol can be polymeric such as the polyester polyols, polyether polyols, polyurethane polyols, etc. or it can be simple diol or triol such as ethylene glycol, propylene glycol, butylene glycol, glycerol, trimethylolpropane or hexanetriol. Mixtures can also be utilized.

The balance of the microparticle comprises a polymer of a vinyl monomer or mixture of vinyl monomers. These monomers as referred to herein as polymerizable species. Examples of suitable materials include acrylic monomers including alkyl esters of acrylic and methacrylic acid, such as methyl acrylate, methyl methacrylate, butyl acrylate, butyl methacrylate, 2-ethylhexyl acrylate, 2-ethylhexyl methacrylate, 2-hydroxyethyl acrylate, 2-hydroxyethyl methacrylate, hydroxypropyl methacrylate, styrene, acrylamide, acrylonitrile, alkyl esters of maleic and fumaric acid, vinyl and vinylidene halides, acrylic acid, ethylene glycol dimethacrylate, isobornyl methacrylate, vinyl acetate, vinyl ethers, allyl ethers, lauryl methacrylate, and N-butoxymethyl acrylamide. Preferably the vinyl monomer used to prepare the polymer which comprises the balance of the microparticle is selected from acrylic monomers. The polymer having a molecular weight greater than 300 is also substantially insoluble in the aqueous medium and is also capable of being dissolved in the monomer mixture which is utilized to prepare the polymer which comprises the balance of the microparticle.

The dispersion of polymeric microparticles in an aqueous medium is preferably prepared by a high stress technique which is described more fully below. First, the vinyl monomer or mixture of vinyl monomers utilized to prepare the polymer which comprises the balance of the microparticle is thoroughly mixed with the aqueous medium and the substantially hydrophobic polymer having a molecular weight greater than 300. For the present application, the vinyl monomer or mixture of vinyl monomers together with the substantially hydrophobic polymer is referred to as the organic component. The organic component generally also comprises other organic species and preferably is substantially free of organic solvent. That is, no more than 20 percent of organic solvent is present. The mixture is then subjected to stress in order to particulate it into microparticles which are uniformly of a fine particle size. The mixture is submitted to stress sufficient to result in a dispersion such that after polymerization less than 20 percent of the polymer microparticles have a mean diameter greater than 5 microns.

The aqueous medium provides the continuous phase of dispersion in which the microparticles are suspended. The aqueous medium is generally exclusively water. However, for some polymer systems, it may be desirable to also include a minor amount of inert organic solvent which can assist in lowering the viscosity of the polymer to be dispersed. For example, if the organic phase has a Brookfield viscosity greater than 1000 centipoise at 25° C. or a W Gardner Holdt viscosity the use of some solvent may be preferred. For some applications of the aqueous microparticle dispersion, for example, in its present use as a resinous binder for coating compositions, it may be desirable to have a coalescing solvent for the coating composition. One can conveniently include this coalescing solvent during the synthesis of the latex as part of the organic component. Examples of suitable water insoluble solvents which can be incorporated in the organic component are benzyl alcohol, xylene, methyl isobutyl ketone, mineral spirits, butanol, butyl acetate, tributyl phosphate and dibutyl phthalate.

As was mentioned above, the mixture is subjected to the appropriate stress by use of a MICROFLUIDIZER ® emulsifier which is available from Microfluidics Corporation in Newton, Massachusetts. The MICROFLUIDIZER ® high pressure impingement emulsifier is patented in U.S. patent 4,533,254 which is incorporated herein by reference. The device consists of a high pressure (up to 20,000 psi) pump and an interaction chamber where the emulsification takes place. The pump forces the mixture of reactants in aqueous medium into the chamber where it is split into at least two streams which pass at very high velocity through at least two slits and collide resulting in the particulation of the mixture into small particles. Generally, the reaction mixture is passed through the emulsifier once at a pressure between 5,000 and 15,000 psi. Multiple passes can result in smaller average particle size and a narrower range for the particle size distribution. When using the aforesaid MICROFLUIDIZER ® emulsifier, stress is applied by liquid-liquid impingement as has been described. However, it should be understood that if desired, other modes of applying stress to the pre-emulsification mixture can be utilized so long as sufficient stress is applied to achieve the requisite particle size distribution, that is, such that after polymerization less than 20 percent of the polymer microparticles have a mean diameter greater than 5 microns. For example, one alternative manner of applying stress would be the use of ultrasonic energy.

Stress is described as force per unit area. Although the precise mechanism by which the MICROFLUIDIZER ® emulsifier stresses the pre-emulsification mixture to particulate it is not thoroughly understood, it is theorized that stress is exerted in more than one manner. It is believed that one manner in which stress is exerted is by shear. Shear means that the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by theory, it is believed that both shear and cavitation contribute to producing the stress which particulates the pre-emulsification mixture.

Once the mixture has been particulated into microparticles, the polymerizable species within each particle are polymerized under conditions sufficient to produce polymer microparticles which are stably dispersed in the aqueous medium. It should be understood that one of the requisite conditions sufficient to achieve the stably dispersed microparticles is the presence in the reaction mixture of a surfactant which is also termed a dispersant. The surfactant is preferably present when the organic component referred to above is mixed into the aqueous medium prior to particulation. Alternatively, the surfactant can be introduced into the medium at a point just after the particulation within the MICROFLUIDIZER ® emulsifier. The surfactant, however, can be an important part of the particle forming process and is often necessary to achieve the requisite dispersion stability. The surfactant can be a material whose role is to prevent the emulsified particles from agglomerating to form larger particles.

The same surfactants or dispersants which can be utilized during conventional emulsion polymerization are also suitable for this high stress technique. Examples of suitable surfactants include the dimethylethanolamine salt of dodecylbenzenesulfonic acid, sodium dioctylsulfosuccinate, ethoxylated nonylphenol and sodium dodecyl benzene sulfonate. Other materials well known to those skilled in the art are also suitable herein. Generally, both ionic and non-ionic surfactants are used together and the amount of surfactant ranges from about 1 percent to about 10 percent, preferably from about 2 percent to about 4 percent, the percentage based on the total solids. One particularly preferred surfactant for the preparation of aminoplast curable dispersions is the dimethylethanolamine salt of dodecylbenzenesulfonic acid.

In order to conduct the free radical polymerization of the polymerizable species a free radical initiator is also required. Both water soluble and oil soluble initiators can be used. Since the addition of certain initiators, such as redox initiators, can result in a strong exothermic reaction, it is generally desirable to add the initiator to the other ingredients immediately before the reaction is to be conducted. Examples of water soluble initiators include ammonium peroxydisulfate, potassium peroxydisulfate and hydrogen peroxide. Examples of oil soluble initiators include t-butyl hydroperoxide, dilauryl peroxide, t-butyl perbenzoate and 2,2'-azobis-(isobutyronitrile). Preferably redox initiators such as ammonium peroxydisulfate/sodium metabisulfite or t-butylhydroperoxide/isoascorbic acid are utilized herein.

It should be understood that in some instances it may be desirable for some of the reactant species to be added after particulation of the remaining reactants and the aqueous medium. For example, water soluble acrylic monomers such as hydroxypropyl methacrylate.

The particulated mixture is then subjected to conditions sufficient to induce polymerization of the polymerizable species, within the microparticles. The particular conditions will vary depending upon the actual materials being polymerized. The length of time required to complete polymerization typically varies from about 10 minutes to about 6 hours.

The progress of the polymerization reaction can be followed by techniques conventionally known to those skilled in the art of polymer chemistry. For example, heat generation, monomer concentration and percent of total solids are all methods of monitoring the progress of the polymerization.

The aqueous microparticle dispersions can be prepared by a batch process or a continuous process. In one batch process the unreacted microdispersion is fed over a period of about 1 to 4 hours into a heated reactor initially charged with water. The initiator can be fed in simultaneously, it can be part of the microdispersion or it can be charged to the reactor before feeding in the microdispersion. The optimum temperature depends upon the specific initiator being used. The length of time typically ranges from about 2 hours to about 6 hours.

In an alternative batch process, a reactor vessel is charged with the entire amount of microdispersion to be polymerized. Polymerization commences when an appropriate initiator such as a redox initiator is added. An appropriate initial temperature is chosen such that the heat of polymerization does not increase the batch temperature beyond the boiling point of the ingredients. Thus for large scale production, it is preferred that the microdispersion have sufficient heat capacity to absorb the total amount of heat being generated.

In a continuous process the pre-emulsion or mixture of raw materials is passed through the homogenizer to make a microdispersion which is immediately passed through a heated tube, e.g., stainless steel, or a heat exchanger in which polymerization takes place. The initiator is added to the microdispersion just before it enters the tubing.

It is preferred to use redox type initiators in the continuous process since other initiators can produce gases such as nitrogen or carbon dioxide which can cause the latex to spurt out of the reaction tubing prematurely. The temperature of reaction can range from about 25° C. to about 80° C., preferably about 35° C. to about 45° C. The residence time typically ranges from about 5 minutes to about 30 minutes.

The tubing in which the reaction occurs is not required to heat the microdispersion but rather to remove the heat being generated. Once the initiator has been added, the reaction begins spontaneously after a short induction period and the reaction exotherm resulting from the polymerization will rapidly raise the temperature.

If there is still free monomer remaining after all of the initiator is consumed, an additional amount of initiator can be added to scavenge the remaining monomer.

Once the polymerization is complete, the resultant product is a stable dispersion of polymer microparticles in an aqueous medium, wherein both the polymer formed from the polymerizable species and the substantially hydrophobic polymer of greater than 300 molecular weight are contained within each microparticle. The aqueous medium, therefore, is substantially free of water soluble polymer. The resultant polymer microparticles are of course insoluble in the aqueous medium. In saying that the aqueous medium is substantially free of water soluble polymer, it is intended that the term "substantially free" means that the aqueous medium contains no more than 30 percent by weight of dissolved polymer, preferably no more than 15 percent.

By "stably dispersed" is meant that the polymer microparticles do not settle upon standing and do not coagulate or flocculate on standing. Typically, when diluted to 50 percent total solids the microparticle dispersions do not settle even when aged for one month at room temperature.

As was stated above, a very important aspect of the polymer microparticle dispersions of the claimed invention is that the particle size is uniformly small, i.e., after polymerization less than 20 percent of the polymer microparticles have a mean diameter which is greater than 5 microns, more preferably greater than 1 micron. Generally, the microparticles have a mean diameter from about 0.01 microns to about 10 microns. Preferably the mean diameter of the particles after polymerization ranges from about 0.05 microns to about 0.5 microns. The particle size can be measured with a particle size analyzer such as the Coulter N4 instrument commercially available from Coulter. The instrument comes with detailed instructions for making the particle size measurement. However, briefly, a sample of the aqueous dispersion is diluted with water until the sample concentration falls within specified limits required by the instrument. The measurement time is 10 minutes.

The microparticle dispersions of the present invention are high solids materials of low viscosity. Dispersions can be prepared directly with a total solids content of from about 45 percent to about 60 percent. They can also be prepared at a lower solids level of about 30 to about 40 percent total solids and concentrated to a higher level of solids of about 55 to about 65 percent by stripping. The molecular weight of the polymer and viscosity of the claimed aqueous dispersions are independent of each other. The weight average molecular weight can range from a few hundred to greater than 100,000. The Brookfield viscosity can also vary widely from about 0.01 poise to about 100 poise, depending on the solids and composition, preferably from about 0.2 to about 5 poise when measured at 25° C. using an appropriate spindle at 50 RPM.

The microparticle dispersion can be either crosslinked or uncrosslinked. When uncrosslinked the polymer within the microparticle can be either linear or branched.

The coating compositions of the claimed invention, in a preferred embodiment, additionally comprise a crosslinking agent which is adapted to cure the polymeric microparticles. Examples of suitable crosslinking agents include aminoplast and blocked polyisocyanate crosslinking agents. These examples are not intended to be limiting as other materials may be suitable herein.

Aminoplast resins are based on the addition products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5 triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Carbitols, and halogen-substituted or other substituted alcohols, such as 3-chloropropanol and butoxyethanol. The preferred aminoplast resins are substantially alkylated with methanol or butanol.

The blocked polyisocyanate which is utilized as a crosslinking agent can be prepared from a variety of polyisocyanates. Preferably the polyisocyanate which is blocked is a diisocyanate. Examples of suitable diisocyanates which can be utilized herein include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be utilized.

Example of suitable blocking agents are those materials which would unblock at elevated temperatures such as lower aliphatic alcohols such as methanol, oximes such as methyl ethyl ketoxime and lactams such as caprolactam.

The claimed coating compositions can contain, in addition to the components described above, a variety of other optional materials. If desired, other resinous materials can be utilized in conjuction with the dispersion of polymeric microparticles so long as the resultant coating composition is not detrimentally affected in terms of physical performance and properties. In addition, materials such as rheology control agents, ultraviolet light stablizers, catalysts, fillers and the like can be present.

The amount of the polymeric microparticle dispersion used to prepare the claimed coating compositions can vary widely depending upon whether a clear coating is desired, a solid colored coating or a metallic coating.

As was mentioned above, the waterborne coating compositions of the present invention are particularly suitable as basecoating compositions in automotive color plus clear applications. For this application pigment is one of the principle ingredients. The pigments which can be utilized are of various types, depending upon whether a metallic pigment is desired. When a metallic coating is desired preferably aluminum flake is utilized. A variety of grades of aluminum flake are available such as Silberline Sparkle Silver 5000 AR, Toyo 8260 and Obron OBT 8167 STAPA M. Other metallic pigments include bronze flakes, coated mica, nickel flakes, tin flakes, silver flakes, copper flakes or combinations of these. Other examples of suitable pigments include mica, iron oxides, lead oxides, carbon black, titanium dioxide, talc, as well as a variety of color pigments. The specific pigment to binder ratio can vary widely so long as it provides the requisite hiding at the desired film thickness and application solids.

As automotive, waterborne basecoating compositions, the compositions of the present invention are very advantageous. The coating compositions can be applied at high application solids of greater than 30 percent which means that one can apply more paint with less passes of the spray gun. It should be pointed out that the claimed coating compositions can be formulated at even higher application solids when using solid color pigments as opposed to metallic pigments. The compositions have good leveling and flow characteristics, exhibit an excellent automotive quality finish which is demonstrated by the excellent flop of the coating. (By "flop" is meant the visual change in brightness or lightness of a metallic coating with the change in viewing angle from 90 through 180 degrees.) The compositions also have excellent cure response and low volatile organic content. Generally, the volatile organic content is less than 3.5 pounds per gallon, usually less than 3.0 pounds per gallon, preferably less than 2.5 pounds per gallon and more preferably less than 1.5 pounds per gallon. In addition, the claimed coating compositions used as basecoats are very versatile and can be utilized with a variety of clear coating compositions including powder clear coats and solvent borne clear coats. Moreover, the theological properties of the coating compositions are such that they can be used in commercial application equipment for automotive applications.

The claimed coating compositions are also advantageously formulated without pigment to prepare clear coating compositions. These clear coating compositions are also quite suitable in automotive color plus clear application as clear coatings.

It should be understood that the claimed coating compositions are also suitable for other applications different from automotive color plus clear. The claimed coatings are also suitable as one coat compositions for use either over primed or unprimed substrates.

The coating compositions of the present invention can be applied by conventional means such as air or airless spray application. The compositions are particularly advantageous in that if desired one can apply the coatings wet-on-wet without an intermediate baking step between coats.

The present invention also is directed to a method of preparing a multilayer, coated substrate. The method comprises as one of the steps, applying to the substrate the waterborne coating composition detailed above. This is followed by the application to said basecoat of a clear coating composition. The multicoated substrate is then cured. As was mentioned above, the waterborne basecoating composition of the present invention can be applied with other coating compositions to a substrate wet-on-wet without an intermediate baking step, although if it is desired, an intermediate baking step can be included. The coating compositions which are suitable for use as the clear coating composition include a wide variety of conventional automotive clear coating compositions which are well know to those skilled in the art, including powder clear coating compositions and solvent borne clear coating compositions.

The coating compositions of the present invention can be cured by baking at a temperature of from about 80° C. to about 150° C. preferably from about 110° C. to about 140° C. It should be understood that for the purposes of the present invention the term "curing" also includes drying since in one embodiment no crosslinking agent is present in the claimed coating compositions, i.e., a lacquer coating.

The following examples are merely illustrative of the invention and are not intended to be limiting.

EXAMPLE I

Part A

Preparation of Latex

A polyurethane acrtylate was prepared from the following ingredients:

| Amount (g) | Material |
|---|---|
| 2064 | polyester polyol having a hydroxyl value of 120 was prepared from trimethylolpropane (15.2%), neopentyl glycol (35.3%), and adipic acid (49.5%). |
| 232 | hydroxyethyl acrylate (HEA) |
| 2.8 | dibutyltin dilaurate |
| 2.8 | butylated hydroxytoluene |
| 488 | tetramethyl xylene diisocyanate (TMXDI) |
| 696 | butyl acrylate (BA) |

The first four ingredients were stirred in a flask as the TMXDI was added over a one hour preiod at a temperature of 70°-80° C. 80g of the utyl acrylate was used to rinse the addition funnel containing the TMXDI and the temperature of the mixture was then held at 70° C. for an additional 2 ours as al the isocyanate reacted. The remainder of the butyl acrtylate was added to produce an 80% solution with a Gardner-Holdt viscosity of X.

A pre-emulsion was made by stirring together the following:

| Amount (g) | Material |
|---|---|
| 600 | polyurethane acrylate |
| 240 | butyl acrylate (includes BA contained in polyurethane acrylate solution) |
| 140 | methyl methacrylate (MMA) |
| 20 | acrylic acid |
| 40 | dimethylethanolammonium dodecylbenzene sulfonate, 50% in water (DDBSA/DMEA) |
| 13.3 | AEROSOL OT-75 which is sodium dioctylsulfosuccinate commercially available from American Cyanamid |
| 8 | 1% aqueous solution of ferrous ammonium sulfate |
| 666 | water |

The pre-emulsion was passed once through a M110 Microfluidizer ® emulsifier at 7000 is to produce a microdispersion. The microdispersion was stirred at 22° C. under nitrogen in a round bottom flask and the following two solutions were added.

| Amount (g) | Material |
|---|---|
| 4 | ammonium persulfate |
| 14.3 | IGEPAL CO-897 which is ethoxylated nonylphenol (89% ethylene oxide) commercially available from GAF Corporation. |
| 284 | water |
| 4 | sodium metabisulfite |
| 250 | water |

The temperature rose spontaneously to 56° C. after 15 minutes. The final product had the following characteristics:

Total solids=44.9%
pH=2.3
Brookfield viscosity (50 rpm, spindle #1)=29 cps
average particles size=201 nm

Part B

Preparation of pigmented coating composition

An aluminum pigment paste was prepared by mixing together the following:

| Ingredients | Grams |
|---|---|
| ethylene glycol monohexyl ether | 15.0 |
| poly(propylene glycol) of molecular weight 425 | 12.0 |
| antigassing additive[1] | 12.2 |
| aluminum pigment | 24.8 |
| CYMEL 303[2] | 25.0 |

[1]This antigassing additive was a phosphatized polyepoxide prepared in the following manner: A mixture of 230.6 g of 85% phosphoric acid and 297.8 g of ethylene glycol n-butyl ether was heated to 120° C. under nitrogen atmosphere. A solution of 979.3 g of EPON 829 (a diglycidyl ether of bisphenol A which is commercially available from Shell Chemical Company) and 431.1 g of ethylene glycol n-butyl ether was added to the phosphoric acid solution over a two hour period. Then, 54.1 g of ethylene glycol n-butyl ether was used to rinse the addition funnel and added to the solution. The solution was held at 120° C. for an additional two hours and 69.5 g of ethylene glycol n-butyl ether were used. The final product has a total solids content of 61.9%, a Gardner Holdt viscosity of Z, and a milliequivalents of acid per gram of 1.889.
[2]This crosslinking agent was a melamine formaldehyde condensation product commercially available from American Cyanamid.

The latex prepared in Part A, above, was neutralized to a pH of about 8.5 in the following manner:

| Ingredients | Grams |
|---|---|
| latex of Part A | 134.6 |
| 75 percent solution of diisopropanolamine in deionized water | 4.4 |

| -continued | |
|---|---|
| Ingredients | Grams |
| N-ethyl morpholine (99 percent) | 0.5 |
| deionized water | 30.5 |

The coating composition was prepared by combining together the pigment paste and neutralized latex prepared above. The coating composition was adjusted to spray viscosity by the addition of 47.1 grams of deionized water.

The coating composition had the following characteristics:

Package solids: 44.8%
Spray viscosity (number 4 Ford cup): 37.9%

The pigmented coating composition was evaluated for use as a basecoating composition over cold rolled steel treated with BONDERITE 40, commercially available from ACT and electrocoated with cationically electrodepositable primer available from PPG Industries, Inc., as ED 4.

The basecoat was spray applied to the substrate at 55.1% relative humidity and baked for 6 minutes at 180° F (82° C.). A solvent borne clear coating composition commercially available from PPG Industries, Inc. as DCT 2000 was then spray applied over the basecoat and baked for 30 minutes at 250° F. (121° C.). The dry film thickness of the basecoat was 0.39 mils and of the clearcoat was 2.0 mils.

The cured film was evaluated for gloss, distinctness of image (DOI) and cross-hatch adhesion both initially after cure and after 16 hours in condensing humidity at 140° F. (60° C.).

Gloss was measured at a 20° angle with a Glossmeter commercially available from Hunter Lab.

DOI was measured with a Glow Box Model GB11-8 commercially available from I²R in Cheltenham, PA.

Condensing humidity exposure resistance was measured with a QCT -Condensation Tester commercially available from Q Panel Company in Cleveland, Oh.

Crosshatch Adhesion was measured with a Paint Adhesion Test Kit commercially available from Paul N. Gardner Company, Inc. using ASTM D 3359 test method. A rating of 5 indicated the test was passed and a rating of 0 indicated the test was failed, with values between these two endpoints being indicative of degrees of loss of adhesion.

| | Results | |
|---|---|---|
| | Before QCT | After QCT |
| Gloss (20°) | 96 | 82 |
| DOI | 70 | 70 |
| Cross-hatch adhesion | 5 | 5 (also, no blush of clearcoat) | the data demonstrates that the coating compositions of the claimed invention have excellent appearance and physical properties and can be applied with convention alcear coats.

EXAMPLE II

Part A

Preparation of Latex

A polyurethane acrylate was prepared form eh following ingredients:

| Amount (g) | Material |
|---|---|
| 1000 | poly(neopentyl glycol adipate) having number average molecular weight of 1000, commercially available as FORMREZ 55-112 (Witco) |
| 116 | hydroxyethyl acrylate (HEA) |
| 1.4 | dibutylin dilaurate |
| 1.4 | butylated hydroxytoluene |
| 244 | tetramethyl xylene diisocyanate (TMXDI) |
| 340 | butyl acrylate (BA) |

The first four ingredients were stirred in a flask as the TMXDI was added over a one hour period at a temperature of 70°-76° C. 90g of the butyl acrylate was used to rinse the addition funnel containing the TMXDI and the temperature of the mixture was then held at 70° C. for an additional 2 hours as al the isocyanate reacted. The remainder of the butyl acrylate was added to produce an 80% solution with a Gardner-Holdt viscosity of X, an acid value of 0.8, and a hydroxyl value of 29.

A pre-emulsion was made by stirring together the following.

| Amount (g) | Material |
|---|---|
| 4800 | polyurethane acrylate of above |
| 1920 | butyl acrylate (includes BA contained in polyurethane acrylate solution) |
| 880 | methyl methacrylate (MMA) |
| 240 | ethylene glycol dimethacrylate (EGDM) |
| 160 | acrylic acid |
| 720 | dimethylethanolammonium dodecylbenzene sulfonate, 50% in water |
| 106.4 | Aerosol OT-75 |
| 64 | 1% aqueous solution of ferrous ammonium sulfate |
| 5328 | water |

The pre-emulsion was passed once through a M110 Microfluidizer ® emulsifier at 7000 psi to produce a microdispersion. The microdispersion was stirred at 21° C. in a five gallon bucket and the following two solutions were added.

| | Amount (g) | Material |
|---|---|---|
| Solution 1: | 32 | ammonium persulfate |
| | 114.4 | Igepal CO-897 |
| | 2136 | water |
| Solution 2: | 32 | sodium metabisulfite |
| | 2136 | water |

The temperature rose spontaneously to 56° C. after 15 minutes. The final product had the following characteristics.

Total solids=46.3%
pH=2.5
Brookfield viscosity (50rpm, #1 spindle)=36 cps
Average particle size=229 nm

Part B

Preparation of Pigmented Coating Compositions

An aluminum pigment paste was prepared by mixing together the following:

| Ingredients | Grams |
|---|---|
| ethylene glycol monohexyl ether | 15.0 |
| poly(propylene glycol) of molecular weight 425 | 12.0 |
| antigassing additive of footnote 1 | 12.6 |
| aluminum pigment | 24.8 |

| Ingredients | Grams |
|---|---|
| RESIMENE 717[3] | 29.8 |

[3] This crosslinker was a methylated melamine formaldehyde condensation product commercially available from Monsanto.

The aforesaid ingredients were stirred for 15 minutes and allowed to stand for one hour.

The latex prepared in Part A, above, was neutralized to a pH of about 8.6 as follows:

| Ingredients | Grams |
|---|---|
| latex of Part A | 134.2 |
| 50 percent solution of dimethylethanolamine in deionized water | 2.6 |

The coating composition was prepared by combining together the aluminum pigment paste and neutralized latex and adjusting the pH to 8.6 by adding 1.1 grams of a 50 percent solution of dimethylethanolamine in deionized water.

The coating composition had the following characteristics:
Package solids: 44,3%
Spray solids: 38.5%
Spray viscosity (number 4 ford cup): 16 seconds The coating composition was applied an evaluated as described above, in Example I with the following particulars. Two evaluations were performed at different humidities.
Relative humidity: 53% and 80%
Clear coat: NCT II which is commercially available from PPG Industries, Inc.
Dry film thickness (basecoat): 0.38 mils
Dry film thickness (clearcoat): 1.6 mils

| | Results | |
|---|---|---|
| | Before QCT | After QCT |
| | (53% humidity) | |
| Gloss (20°) | 86 | 85 |
| DOI | 80 | 50 |
| Cross-hatch adhesion | 5 | 5 (slight blush of clearcoat) |
| | 80% (humidity) | |
| Gloss (20°) | 86 | 84 |
| DOI | 85 | 65 |
| Cross-hatch adhesion | 5 | 5 (blush of clearcoat) |
| | 80% humidity | |
| | (10 days 110° F. (43° C.) | |
| Gloss (20°) | 86 | 87 |
| DOI | 85 | 65 |
| Cross-hatch adhesion | 5 | 5 (blush of clearcoat) |

EXAMPLE III

Part A

Preparation of Latex

A polyurethane acrtylate was prepared from the following ingredients:

| Amount (g) | Material |
|---|---|
| 4839 | poly(neopentyl glycol adipate), number average molecular weight of 1000, commercially available as FORMREZ 55-112 from Witco |
| 360 | hydroxyethyl acrylate (HEA) |
| 6.2 | dibutyl tin dilaurate |
| 0.62 | hydroquinone |
| 1030 | trimethylhexamethylenediisocyanate (TMDI) |
| 1098 | methyl methacrylate (MMA) |

The first four ingredients were stirred in a flask as the TMDI was added over four hours at a temperature of 50°–60° C. The temperature was then held at 60°–70° C. for an additional 11 hours as all the isocyanate reacted. MMA was added to produce an 85% solution with a Gardner-Holdt viscosity of Z2. The hydroxyl equivalent weight of the polymer was 1920.

A pre-emulsion was made by stirring together the following:

| Amount (g) | Material |
|---|---|
| 4219 | polyurethane acrylate |
| 4224 | butyl acrylate (BA) |
| 528 | methyl methacrylate (includes MMA contained in the polyurethane acrylate solution) |
| 422 | ethylene glycol dimethacrylate (EGDM) |
| 211 | hydroxypropyl methacrylate (HPMA) |
| 211 | acrylic acid |
| 42.2 | sodium metabisulfite |
| 422 | dimethylethanolammonium dodecylbenzene sulfonate, 50% in water (DDBSA/DMEA) |
| 141 | Aerosol OT-75 |
| 7040 | water |

The pre-emulsion was passed once through a M110 Microfluidizer ® emulsifier at 3000 psi to produce a microdispersion in 678 minutes.

An initiator solution was prepared by mixing the following:

| Amount (g) | Material |
|---|---|
| 42.2 | ammonium persulfate |
| 106 | Igepal CO-630 |
| 84 | 1% aqueous solution of ferrous ammonium sulfate |
| 6003.8 | water |

The microdispersion was pumped into a stirred, ice-cooled flask at a rate of 120g per minute as the initiator solution was pumped in at a rate of 40 g per minute. After about 300 g of the mixture had entered the flask it was pumped out at a rate of 160 g per minute and forced through a coil of 1678 feet of ⅜ inch (0.95 centimeter) stainless steel tubing partially immersed in water held at a temperature of 35° C. the coil consisted of either sections separated by T-shaped connectors through which thermometers could be inserted or samples of the micro dispersions could be removed. The temperature of the microdispersion oat the seven connectors was measured at 34° C., 36° C., 33° C., 32° C., 31° C., 31° C., and 29° C.

The microdispersion spent about 15 minutes going through the heated coil before it was passed through a 20 foot coil (6 meters) of 3/8 inch (0.95 centimeter) polypropylene tubing immersed in a water bath held at 24° C.. The microdispersion emerged at a temperature of 25° C. and was collected in seven one gallon jars and filtered through a 150 mesh sieve. The product had the following characteristics:
Total solids =45.0%

Brookfield viscosity (50 rpm, spindle #1) = 23 cps
pH = 2.6
Free monomer = none detected
Particle size = 262 nm
Filtered coagulum = 0.003%

Part B

Preparation of Pigmented Basecoating Composition

The aluminum pigment paste used to prepare the coating composition as the same as that described in Example I, above. The latex as neutralized in the same manner; with slightly different proportions:

| Ingredients | Grams |
|---|---|
| latex of Part A | 135.8 |
| 75% diisopropanolamine solution in deionized water | 10.6 |
| N-ethyl morpholine (99%) | 1.2 |
| deionized water | 30.6 |

The coating composition was prepared by combining the pigment paste and neutralized latex and adjusting to a spray viscosity of 15.1 seconds (number b 4 ford cup) with 56.8 grams of deionized water. The coating composition had the following characteristics:

Package solids: 43.4%
Spray solids: 35.8%
Package pH: 8.5%

The application and evaluation of the coating composition was conducted as detailed above in Example I with the following particulars:

Relative Humidity: 55.1%
Dry film thickness (basecoat): 0.34 mils
Dry film thickness (clearcoat): 2.0 mils
clearcoat: DCT 200 commercially available from PPG Industries, Inc.

| | Results | |
|---|---|---|
| | Before QCT | After QCT |
| Gloss (20°) | 91 | 93 |
| DOI | 70 | 70 |
| Cross-hatch Adhesion | 5 | 5 (no blush of clearcoat) |

What is claimed is:

1. A waterborne coating composition wherein the volatile organic content is less than 3.5 pounds per gallon and having a total solids content at application of greater than 30 percent, comprising pigment, crosslinking agent and a dispersion of polymeric micropaticles in an aqueous medium wherein the microparticles are prepared by forming a mixture in aqueous medium of a vinyl monomer or mixture o vinyl monomers with greater than 30 percent by weight based on the microparticles of a polymer which is substantially hydrophobic such that when the polymer is mixed with the aqueous medium and vinyl monomer or mixture of vinyl monomers a majority of the polymer is in the organic phase and a separate aqueous phase is obtained; said polymer being essentially free of repeating acrylic or vinyl units in the backbone, has a molecular weight greater than 300 and contains functional groups which are capable of reacting with the crosslink agent; and particularizing said mixture into microparticles by high stress techniques followed by polymerizing the polymerizable species within the microparticles to produce the polymeric microparticles which are stably dispersed in the aqueous medium; and the aqueous medium o the mciroparticle dispersion being substantially free of water soluble polymer.

2. The coating composition of claim 1 wherein less than 20 percent of the polymer microparticles have a means diameter greater tan one micron.

3. The coating composition of claim 2 wherein the polymeric microparticles have a man diameter ranging from about 0.01 microns to about 10 microns.

4. The coating composition claim 3 wherein eh means diameter of the polymer microparticles ranges from about 0.05 microns to about 0.5 microns.

5. The coating composition of claim 1 wherein the vinyl monomer or mixture of vinyl monomers is selected from acrylic monomers.

6. The coating composition of claim 1 wherein the polymer having molecular weight greater than 300 is selected from the group consisting of polyesters and polyurethanes.

7. The coating composition of claim 1 wherein the volatile organic content is less than 3.0 pounds per gallon.

8. The coating composition of claim 70 wherein the volatile organic content is less than 2.5 pounds per gallon.

9. The coating composition of claim 1 wherein the polymer microparticles are crosslinked.

10. The coating composition of claim 1 wherein the polymer microparticles are uncrosslinked.

11. A waterborne coating composition wherein he volatile organic consent is less than 3.5 pounds per gallon and having a total solids content at application of greater than 30 percent, comprising crosslinking agent and a dispersion of polymeric micropaticles in an aqueous medium wherein the microparticles are prepared by forming a mixture in aqueous medium of a vinyl monomer or mixture of vinyl monomers with greater than 30 percent by weight based on the microparticles of a polymer which is substantially hydrophobic such that when the polymer is mixed with the aqueous medium and vinyl monomer or mixture of vinyl monomers a majority o the polymer is in the organic phase and a separate aqueous phase is obtained; said polymer being essentially free of repeating acrylic or vinyl units in the backbone, has a molecular width greater than 300 and contains functional groups which are capable o reacting with the crosslinking agent; and particulation said mixture into microparticles by high stress techniques followed by polymerizing the polymerizable species within the microparticles o produce the polymeric microparticles which are stably dispersed in the aqueous medium; the aqueous medium of the microparticle dispersion being substantially free f water soluble polymer.

* * * * *

UNITED STATES PATENT AND TRADEMARK OFFICE
CERTIFICATE OF CORRECTION

PATENT NO. : 5,071,904

DATED : December 10, 1991

INVENTOR(S) : Roxalana L. Martin et al

It is certified that error appears in the above-identified patent and that said Letters Patent is hereby corrected as shown below:

Col. 17, line 51, "micropati-" should be -- microparti- --.

Col. 17, line 54, "o" should be --of--.

Col. 18, line 3, "crosslink" should be --crosslinking--.

Col. 18, line 4, "particularizing" should be --particulating--.

Col. 18, line 8, delete "and".

Col. 18, line 8, "o" should be --of--.

Col. 18, line 9, "mciroparticle" should be --microparticle--.

Col. 18, line 13, "means" should be --mean--.

Col. 18, line 13, "tan" should be --than--.

Col. 18, line 15, "man" should be --mean--.

Col. 18, line 17, insert --of-- after "composition".

Col. 18, line 17, "eh means" should be -- the mean--.

Col. 18, line 18, "microparticles" should be --microparticle--.

Col. 18, line 30, "70" should be --7--.

Col. 18, line 37, "he" should be --the--.

UNITED STATES PATENT AND TRADEMARK OFFICE
CERTIFICATE OF CORRECTION

PATENT NO. : 5,071,904

DATED : December 10, 1991

INVENTOR(S) : Roxalana L. Martin, et. al.

It is certified that error appears in the above-identified patent and that said Letters Patent is hereby corrected as shown below:

Col. 18, line 38, "consent" should be --content--.

Col. 18, line 41, "micropaticles" should be --microparticles--.

Col. 18, line 49, "o" should be --of--.

Col. 18, line 52, "width" should be --weight--.

Col. 18, line 53, "o" should be --of--.

Col. 18, line 54, "particulation" should be --particulating--.

Col. 18, line 57, "o" should be --to--.

Col. 18, line 60, "f" should be --of--.

Signed and Sealed this

Twenty-fifth Day of May, 1993

Attest:

MICHAEL K. KIRK

*Attesting Officer*    Acting Commissioner of Patents and Trademarks